United States Patent
Polasa et al.

(10) Patent No.: US 11,640,192 B2
(45) Date of Patent: May 2, 2023

(54) METHOD AND APPARATUS FOR IMPLEMENTING A PROGRAMMABLE POWER SUPPLY ON A USB-C PORT SUPPORTING POWER DELIVERY

(71) Applicant: SILICONCH SYSTEMS PVT LTD, Karnataka (IN)

(72) Inventors: Rakesh Kumar Polasa, Karnataka (IN); Shubham Paliwal, Uttar Pradesh (IN); Alagesan Mani, Tamil Nadu (IN)

(73) Assignee: SiliConch Systems Pvt Ltd, Karnataka (IN)

( * ) Notice: Subject to any disclaimer, the term of this patent is extended or adjusted under 35 U.S.C. 154(b) by 61 days.

(21) Appl. No.: 17/514,833

(22) Filed: Oct. 29, 2021

(65) Prior Publication Data
US 2022/0221922 A1    Jul. 14, 2022

(30) Foreign Application Priority Data
Jan. 12, 2021   (IN) .............................. 202141001448

(51) Int. Cl.
G06F 1/26      (2006.01)
G06F 1/3215    (2019.01)

(52) U.S. Cl.
CPC ............ *G06F 1/266* (2013.01); *G06F 1/3215* (2013.01)

(58) Field of Classification Search
CPC .............................. G06F 1/266; G06F 1/3215
USPC ........................................................ 713/300
See application file for complete search history.

(56) References Cited

U.S. PATENT DOCUMENTS

| | | | |
|---|---|---|---|
| 10,599,597 B2 * | 3/2020 | Mattos | G06F 1/266 |
| 10,614,017 B1 * | 4/2020 | Hsieh | G06F 1/3253 |
| 2015/0362984 A1 * | 12/2015 | Waters | G06F 1/266 |
| | | | 713/324 |
| 2017/0293335 A1 * | 10/2017 | Dunstan | H02J 50/10 |
| 2019/0278731 A1 * | 9/2019 | Mattos | G06F 1/266 |
| 2019/0288532 A1 * | 9/2019 | Mattos | H02J 7/0034 |
| 2020/0233830 A1 * | 7/2020 | Trethewey | H02J 50/10 |
| 2020/0341036 A1 * | 10/2020 | Liu | G01R 19/16538 |
| 2021/0320514 A1 * | 10/2021 | Polasa | H02M 3/1563 |

OTHER PUBLICATIONS

Universal Serial Bus Type-C Cable and Connector Specification Release 2.0, USB 3.0 Promoter Group, Aug. 2019 (373 pages).
Universal Serial Bus Power Delivery Specification, Revision 3.0, Version 2.0, Aug. 29, 2019 (657 pages).

* cited by examiner

*Primary Examiner* — Chun Cao
(74) *Attorney, Agent, or Firm* — Procopio, Cory, Hargreaves & Savitch LLP

(57) ABSTRACT

The present disclosure provides an apparatus and a method for implementing a USB-IF certified programmable power supply algorithm on a USB-C port. The method involves using a software code running on a microcontroller which monitors voltage and current being supplied by a power supply controller IC on a VBUS line of the USB-C port. Based on the detected voltage/current corrective actions are taken by the software code to bring the voltage/current to accepted levels as requested by a port partner. Further, a PPS accelerator is configured to compute an average or a new current/voltage value and provide the computed average or a new current/voltage value to a microcontroller for subsequent decision making and for other related assessment process.

11 Claims, 4 Drawing Sheets

METHOD AND APPARATUS FOR IMPLEMENTING A PROGRAMMABLE POWER SUPPLY ON A USB-C PORT SUPPORTING POWER DELIVERY

CROSS REFERENCE TO RELATED APPLICATIONS

This Paris Convention Patent Application claims benefit under 35 U.S.C. § 119 and claims priority to Indian Patent Application No. IN 202141001448, filed on Jan. 12, 2021, titled "METHOD AND APPARATUS FOR IMPLEMENTING A PROGRAMMABLE POWER SUPPLY ON A USB-C PORT SUPPORTING POWER DELIVERY", the content of which is incorporated herein in its entirety by reference for all purposes.

TECHNICAL FIELD

The present disclosure generally relates to power supply devices. More specifically, the present disclosure relates to a method and system for implementing programmable power supply on a Universal Serial Bus Type-C (USB-C) port.

BACKGROUND

Background description includes information that can be useful in understanding the present invention. It is not an admission that any of the information provided herein is prior art or relevant to the presently claimed invention, or that any publication specifically or implicitly referenced is prior art.

Universal Serial Bus (USB) is an industry protocol designed to standardize interfaces between computing devices for communication and for supplying electrical power. The USB protocols have enjoyed widespread adoption in nearly every computing device and have received tremendous support in terms of technology development with well-established and standardized software infrastructure. USB is one of most common interfaces for connecting a variety of peripherals to computers and providing relatively local and small levels of data transfer. USB interfaces can be found on everything from personal computers and laptops, to peripheral devices, mobile phones, cameras, flash memory sticks, back up hard-drives and many other devices. USB has been implemented in several versions to meet data transfer and power requirements. The versions can be USB 1, USB 1.1, USB 2 and USB 3.

USB is a host-centric plug-and-play bus. A logical USB bus connects USB devices with USB host, using a physical tiered star topology. A system has one host with a hub at the centre of each star. Hubs convert a single attachment point (port) into multiple attachment points. The upstream port of a hub connects the hub towards the host. Each of the downstream ports of a hub allows connection to another hub or a function. Each wire segment is a point-to-point connection between the host and a hub or function, or a hub connected to another hub or function. A function of a USB device to transmit or receive data or control information over the bus and as such provide capabilities to the system. Examples of functions include locator devices, such as a mouse, tablet, or light pen, input devices, such as a keyboard or a scanner, output devices, such as a printer or digital speakers, and a telephony adapter. Each function contains configuration information that describes its capabilities and resource requirements. Before a function can be used, the host must configure it. This configuration includes allocating USB bandwidth and selecting function-specific configuration options.

USB Power delivery (USB PD) is a half-duplex serial communication layered protocol where data communication between the port partners occurs through Configuration Channel (CC) lines while power transmission occurs through VBUS line. The power transmission aspect is usually conducted by varying voltage to cause current flow.

USB ports are implemented extensively to connect peripheral devices to computing devices such as computer, laptop, personal digital assistant (PDA), and so on. USB ports can be implemented for providing charging of various electronic devices and computing devices. There are general peripheral connections connected through USB can be printers, scanners, zip drives, digital cameras, mice, joysticks, modems, speakers, telephones, video phones and any other network connections. A USB cable, according to the USB standard, has a power supply line of +5V, a ground line, and two D+ and D− signal lines. The USB cable, according to the USB standard, can supply a predefined or predetermined current in mA at +5V while transmitting signals. A type of performing charging using this power supply is called USB charging. USB connectors are provided at either end of USB cable to enable connection between any or a combination of computing devices, electronic devices, power adapter etc. through USB ports. USB connectors can be of multiple types such as USB type-A connector (USB-A), USB type-B connector (USB-B), USB type-C connector (USB-C), Mini-USB (of both type-A and type-B), Micro-USB (of both type-A and type-B) and so on. According to USB connectors, there can be corresponding USB ports or sockets (such as type-A, type-B, type-C, Mini-USB, Micro-USB etc.).

USB Power Delivery (PD) protocol's specification Rev. 3, Version 1.1 provides properties and characteristics of various components and elements with respect to providing a programmable power supply. While these are merely mandates provided by a standardized entity with respect to respective conditions, the document fails to provide information pertaining to other aspects of the protocol.

The USB system is typically associated with USB devices and one crucial aspect of those USB devices is the power supply aspect along with a reliable, safe, and robust system for either maintaining or prolonging the battery life of USB devices. Programmable power supply architectures are used to provide a reliable, safe, and robust system for either maintaining or prolonging the battery life of such USB devices. While this affords a programmable power supply system, currently existing designs and systems provide power supplies that lack battery requirement considerations. As a consequence, batteries in these USB devices are provided power supply without any regulation leading to problems such as heating, overheating, and the like. Thus, there exists a need to develop methods and apparatuses that provide a programmable power supply that addresses the heating problem.

A second issue with current programmable power supply architectures is that such architectures are not flexible in that they do not account for the constantly changing specification of the USB protocol. One reason for this is that currently extant architectures are based on analogue systems. Thus, there is a need to overcome such a hindrance in the current art.

Efforts have been made in the related or existing art to devise a method and system for implementing programmable power supply on a USB-C port.

For example, US patent document no. U.S. Pat. No. 10,148,108B2 discloses a USB-C power delivery adapter. The disclosure discloses link connections between two USB-C logic blocks with one block being connected to a charger block of an electric charger circuitry. The link connections serve as data paths. The second USB-C logic block connects the first USB-C logic block to a USB-C power adapter. While this patent document attempts to address the heating problem associated with USB-C power adapters, the solution offered is inadequate in that it not only fails to effectively address the heating problem but also does not address the USB specification accountability aspect.

Therefore, there is a need in the art to provide a reliable and efficient method and system for implementing programmable power supply on a USB-C port.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Some of the objects of the present disclosure, which at least one embodiment herein satisfies are as listed herein below.

It is an object of the present disclosure to provide a method and apparatus for implementing a programmable power supply on a USB-C port supporting power delivery.

It is another object of the present disclosure to provide a simple and cost-effective method and apparatus for implementing a programmable power supply on a USB-C port supporting power delivery.

It is another object of the present disclosure to provide a reliable and efficient method and apparatus for implementing a programmable power supply on a USB-C port supporting power delivery.

It is another object of the present disclosure to provide a robust method and apparatus for implementing a programmable power supply on a USB-C port supporting power delivery.

The present disclosure relates to power supply devices. More specifically, the present disclosure relates to a method and system for implementing programmable power supply on a USB-C port.

This summary is provided to introduce simplified concepts of a system for time bound availability check of an entity, which are further described below in the detailed description. This summary is not intended to identify key or essential features of the claimed subject matter, nor is it intended for use in determining/limiting the scope of the claimed subject matter.

An aspect of this present disclosure pertains to an apparatus for providing a programmable power supply (PPS) in a USB-C system. The apparatus comprises a power supply controller unit a PPS accelerator unit, a voltage variation unit, an analog/digital converter (ADC), a USB-C port and power delivery controller unit and a microcontroller unit which is used for storing computer code for PPS implementation. The power supply controller unit is configured to supply power on a VBUS line associated with the USB-C system. A PPS accelerator is configured to compute average or new current/voltage values and provide the same to a microcontroller for subsequent decision-making and other related assessment processes. A voltage variation unit is configured to maintain a respective constant current or a respective limited current on the VBUS line with respect to a constant current mode or a limiting current mode by varying a voltage value, where a constant power mode comprises the constant current mode. A microcontroller having an embedded power supply algorithm is configured to compute a select current value. The microcontroller is configured to constantly monitor, detect, compare, and adjust a given current value with respect to a select current value on the VBUS line through PPS accelerator unit and power supply unit. The power supply controller unit is configured to adjust the given current value with respect to the select current value by means of the voltage variation unit subsequent to the computation of the select current value from the PPS accelerator unit. The USB-C port and power delivery controller is an implementation on the USB-C system to implement USB-C port and power delivery communication. The ADC is used for measuring VBUS voltage and current.

In an aspect, the power supply controller adjusts the given current value with respect to a select current value by means of the voltage variation unit subsequent the computation of the select current value.

In an aspect, the microcontroller is an implementation on the USB-C system.

In an aspect, the power supply unit, the voltage variation unit, ADC and the microcontroller form a single adapter unit.

In another aspect, the single adapter unit further comprises a USB-C port and power delivery controller capable of identifying a connection or a disconnection status on a USB-C port associated with the USB-C system.

In an application, the microcontroller is an 8051-type microcontroller, arm controller or any other microcontroller.

In an aspect, the single adapter unit includes a power supply controller which detects the given current value on the VBUS line by receiving a request from the microcontroller.

In another aspect, the power supply controller exists independently of the single adapter unit.

In a yet another aspect, the power supply controller detects the given current value on the VBUS line by means of an ADC (analog to digital converter) which can be present independently also in the system.

In an aspect, the power supply controller includes an interface subscribing to the I2C serial protocol for two-wire interface, or a direct current/voltage feedback mechanism or through any other mechanism.

In an aspect, the voltage variation unit includes an interface subscribing to the I2C serial protocol for two-wire interface, or a direct current/voltage feedback mechanism or through any other mechanism which is present in the power supply controller.

Another aspect of the present disclosure pertains to a method for providing programmable power supply in a USB-C system. The method comprises determining, at a microcontroller, a plurality of samples corresponding to voltage and current and calculating an average voltage and current on receiving a USB PD PPS request; determining, at the microcontroller, if a constant voltage mode flag is set; upon receiving a positive confirmation, determining, at the controller, if a value for an average current is greater than a value for a constant load requested for the current, a constant load mode flag is set, else continue to wait for a first configurable time (in milliseconds) and gather a first configurable number of voltage and current samples; upon receiving a negative confirmation, determining, at the microcontroller, if a value for a voltage set is equal to a value for a voltage requested, and if the value for the voltage set is equal to the value for the voltage requested along with difference of requested current and a first configurable threshold current being greater than average current, a constant voltage mode flag is set and continue to wait for a first configurable time (in milliseconds) and gather a first configurable number of voltage and current samples, and if the value for the voltage set is unequal to the value for the voltage requested and difference of requested current and first configurable threshold current being lesser than average current, then determining, at the microcontroller, if the value for the voltage set is less than or equal to a minimum voltage value, wherein upon determining that the value for the voltage set is less than or equal to a minimum voltage value a USB PD hard reset instruction is generated, else if absolute value or modulus of difference between average current and set current is greater than a second configurable threshold current or with requested voltage being less than set voltage, a new resistor parameter is set along with a new set voltage, a new set current, and wherein a saturation limit is set, the saturation limit being when the new set voltage is between a voltage requested and a minimum voltage to establish a new value for the voltage subsequently setting the set voltage to new set voltage and set current to new set current, and wherein waiting for a first configurable time period to determine, at a microcontroller, the plurality of samples corresponding to voltage and current and calculating an average voltage and current. If absolute value or modulus of difference between average current and set current is less than a second configurable threshold current and the requested voltage is greater than the set voltage, continue waiting for a first configurable time-period and the plurality of samples corresponding to voltage and current for calculating an average voltage and current for next round of comparisons.

In an aspect, the controller corresponds with the voltage variation unit to adjust the voltage output such that the current value on the VBUS line is adjusted with respect to the select current value.

In another aspect, the voltage variation unit is configured to subscribe to a constant current mode which involves maintaining a constant current value on the VBUS line, and a limiting current mode which involves maintaining an oscillating current value on the VBUS line.

Yet another aspect of the present disclosure pertains to a non-transitory machine-readable medium having stored thereon instructions, which if performed by a machine cause the machine to perform a method comprising the four following steps. Determining, at a microcontroller, a plurality of samples corresponding to voltage and current and calculating an average voltage and current on receiving a USB PD PPS request; determining, at the microcontroller, if a constant voltage mode flag is set; upon receiving a positive confirmation, determining, at the microcontroller, if a value for an average current is greater than a value for a constant load requested for the current, a constant load mode flag is set, else continue to wait for a first configurable time (in milliseconds) and gather a first configurable number of voltage and current samples; upon receiving a negative confirmation, determining, at the microcontroller, if a value for a voltage set is equal to a value for a voltage requested, and if the value for the voltage set is equal to the value for the voltage requested along with difference of requested current and a first configurable threshold current being greater than average current, a constant voltage mode flag is set and continue to wait for a first configurable time (in milliseconds) and gather a first configurable number of voltage and current samples, and if the value for the voltage set is unequal to the value for the voltage requested and difference of requested current and first configurable threshold current being lesser than average current, then determining, at the controller, if the value for the voltage set is less than or equal to a minimum voltage value, wherein upon determining that the value for the voltage set is less than or equal to a minimum voltage value a USB PD hard reset instruction is generated, else if absolute value or modulus of difference between average current and set current is greater than a second configurable threshold current or with requested voltage being less than set voltage, a new resistor parameter is set along with a new set voltage, a new set current, and wherein a saturation limit is set, the saturation limit being when the new set voltage is between a voltage requested and a minimum voltage to establish a new value for the voltage subsequently setting the set voltage to new set voltage and set current to new set current, and wherein waiting for a first configurable time period to determine, at a microcontroller, the plurality of samples corresponding to voltage and current and calculating an average voltage and current. If absolute value or modulus of difference between average current and set current is less than a second configurable threshold current and the requested voltage is greater than the set voltage, continue waiting for a first configurable time-period and the plurality of samples corresponding to voltage and current for calculating an average voltage and current for next round of comparisons.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The diagrams are for illustration only, which thus is not a limitation of the present disclosure, and wherein.

DETAILED DESCRIPTION

Figure 1:
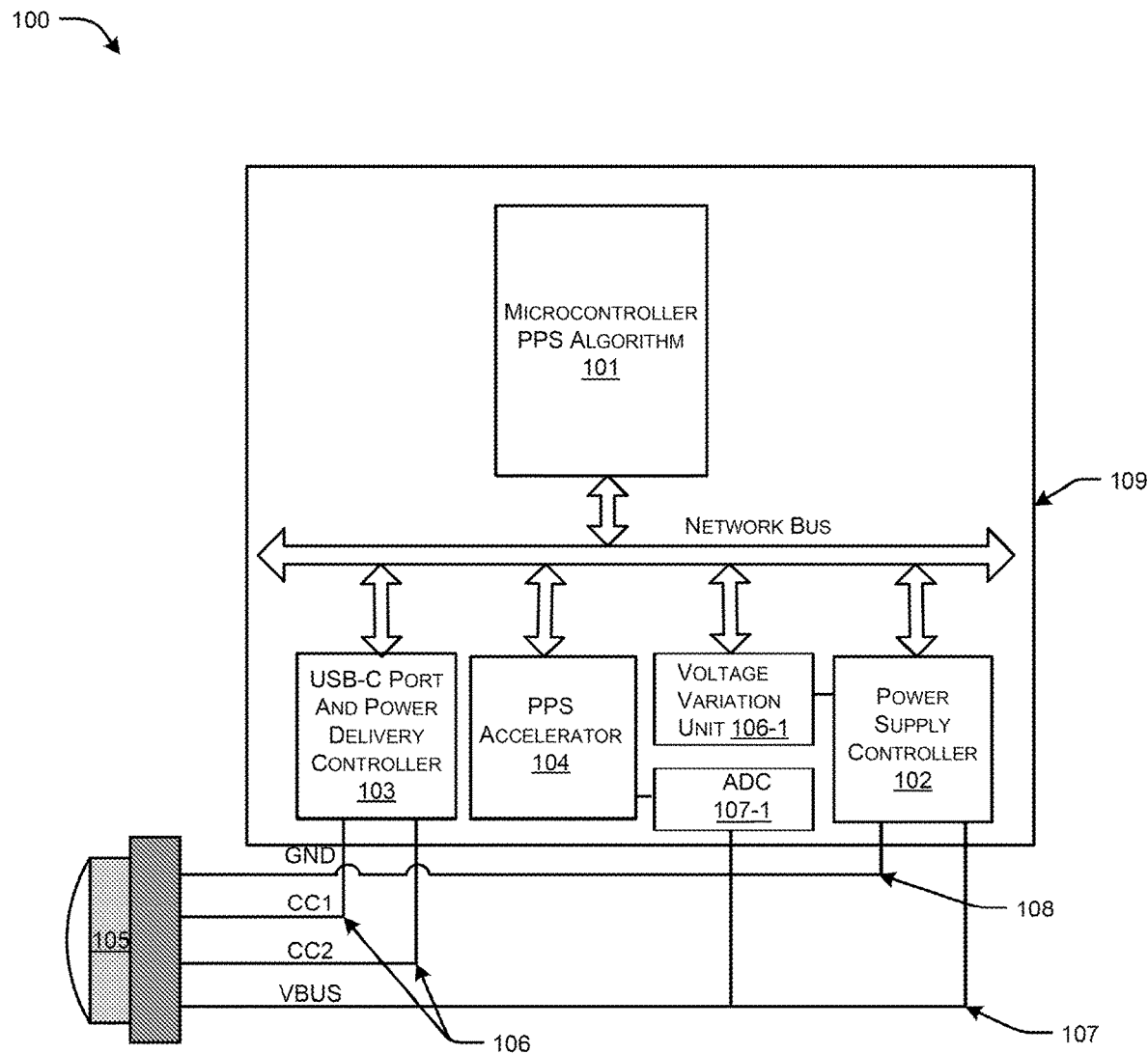
FIG. 1 illustrates an exemplary schematic representation of an apparatus for providing a programmable power supply in a USB-C system, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates to power supply devices. More specifically, the present disclosure relates to a method and system for implementing programmable power supply on a USB-C port.

An aspect of this present disclosure pertains to an apparatus for providing a programmable power supply (PPS) in a USB-C system. The apparatus comprises a power supply controller unit, a PPS accelerator unit, a voltage variation unit, an ADC, a USB-C port and power delivery controller unit and a microcontroller unit which is used for storing computer code for PPS implementation. The power supply controller unit is configured to supply power on a VBUS line associated with the USB-C system. A PPS accelerator is configured to compute average or new current/voltage values and provide the same to a microcontroller for subsequent decision-making and other related assessment processes. A voltage variation unit is configured to maintain a respective constant current or a respective limited current on the VBUS line with respect to a constant current mode or a limiting current mode by varying a voltage value, where a constant power mode comprises the constant current mode. A microcontroller having an embedded power supply algorithm configured to compute a select current value. The microcontroller is configured to constantly monitor, detect, compare, and adjust a given current value with respect to a select current value on the VBUS line through PPS accelerator unit and power supply unit. The power supply controller unit is configured to adjust the given current value with respect to the select current value by means of the voltage variation unit subsequent to the computation of the select current value from the PPS accelerator unit. The USB-C port and power delivery controller is an implementation on the USB-C system to implement USB-C port and power delivery communication. The ADC is used for measuring VBUS voltage and current.

A voltage variation unit is configured to maintain a respective constant current or a respective limited current on the VBUS line with respect to a constant current mode or a limiting current mode by varying a voltage value where a constant power mode comprises the constant current mode. The controller is configured to constantly monitor, detect, compare, and adjust a given current value with respect to a select current value on the VBUS line. The controller also has an embedded power supply algorithm configured to compute a select current value based on the power sink unit.

Another aspect of the present disclosure pertains to an apparatus for providing a programmable power supply (PPS) in a USB-C system. The apparatus comprises a power supply unit, a voltage variation unit, a USB-C port and power delivery controller and a microcontroller. The power supply unit is configured to supply power on a VBUS line associated with the USB-C system. The voltage variation unit configured to maintain a respective constant current or a respective limited current on the VBUS line with respect to a constant current mode or a limiting current mode by varying a voltage value. The controller has an embedded power supply algorithm and is configured to compute a select current value, is configured to constantly monitor, detect, compare, and adjust a given current value with respect to a select current value on the VBUS line.

In an aspect, the controller adjusts the given current value with respect to a select current value by means of the voltage variation unit subsequent the computation of the select current value.

In an aspect, the controller is an implementation on the USB-C system.

In an aspect, the power supply unit, the voltage variation unit, and the controller form a single adapter unit.

In another aspect, the single adapter unit further comprises a power delivery controller capable of identifying a connection or a disconnection status on a USB-C port associated with the USB-C system.

In an application, the controller is an 8051-type microcontroller or any other microcontroller.

In an aspect, the single adapter unit includes a power supply controller which detects the given current value on the VBUS line by receiving a request from the controller.

In another aspect, the power supply controller exists independently of the single adapter unit.

In a yet another aspect, the power supply controller detects the given current value on the VBUS line by means of an ADC.

In an aspect, the power supply controller includes an interface subscribing to the I2C serial protocol for two-wire interface, or a direct current/voltage feedback mechanism.

In an aspect, the voltage variation unit includes an interface subscribing to the I2C serial protocol for two-wire interface, or a direct current/voltage feedback mechanism or through any other mechanism which is present in the power supply controller.

Another aspect of the present disclosure pertains to a method for providing programmable power supply in a USB-C system. The method comprises monitoring, by means of a controller, a current value on a VBUS line associated with the USB-C system. The method also comprises comparing, by means of the controller, the current value on the VBUS line associated with the USB-C system with respect to a select current value computed by an embedded power supply algorithm included in the controller. The method also comprises adjusting, by means of a voltage variation unit, a voltage input associated with the USB-C system such that the current value on the VBUS line is adjusted with respect to the select current value.

In an aspect, the controller corresponds with the voltage variation unit to adjust the voltage input such that the current value on the VBUS line is adjusted with respect to the select current value.

In another aspect, the voltage variation unit is configured to subscribe to a constant current mode which involves maintaining a constant current value on the VBUS line, and a limiting current mode which involves maintaining an oscillating current value on the VBUS line.

Yet another aspect of the present disclosure pertains to a non-transitory machine-readable medium having stored thereon instructions, which if performed by a machine cause the machine to perform a method comprising the four following steps. One step is that of monitoring, by means of a controller, a current value on a VBUS line associated with the USB-C system. Another step is that of comparing, by means of the controller, the current value on the VBUS line associated with the USB-C system with respect to a select current value computed by an embedded power supply algorithm included in the controller. Yet another step is that of adjusting, by means of a voltage variation unit, a voltage input associated with the USB-C system such that the current value on the VBUS line is adjusted with respect to the select current value.

In an aspect, the controller corresponds with the voltage variation unit to adjust the voltage input such that the current value on the VBUS line is adjusted with respect to the select current value.

In another aspect, the voltage variation unit is configured to subscribe to a constant current mode which involves maintaining a constant current value on the VBUS line, and a limiting current mode which involves maintaining an oscillating current value on the VBUS line.

FIG. 1 illustrates an apparatus 100 for providing a programmable power supply (PPS) in a USB-C system in accordance with an embodiment of the present disclosure. The apparatus is typically a single adapter unit 109 which comprises a microcontroller (uC) 101 having an embedded algorithm, a power supply controller 102, a power delivery controller 103, a programmable power supply (PPS) accelerator 104, a voltage variation unit 106-1, an ADC 107, and a USB-C port or receptacle 105. These elements 101, 102, 103, 104, 105, 106-1, 107-1 are communicatively connected to each other by network buses and other interfaces in accordance with the desired implementation. Generally speaking, as shown in FIG. 1, all components shown have a function with a certain goal and for example, the microcontroller 101 has control over other components with respect to at least one aspect of those components and which will heretofore be described.

FIG. 1 shows a general architecture of the apparatus 100 that can provide a programmable power supply and as such, the figure shown is only an indication as to one embodiment and therefore, the components shown in FIG. 1 can be placed in any manner and arrangement that may be appreciated by a person skilled in the art.

The microcontroller 101 typically is a controller device with respective systems and mechanisms that are in-built and which will be appreciated by a person skilled in the art. In some embodiments, the microcontroller 101 is a controller. In the illustrated embodiment, it is a low cost, has high performance based integrated circuit or a memory control unit with one primary function being that of monitoring the current flowing at a given time on a VBUS line 107 of the apparatus 100 as shown. In another embodiment, the microcontroller 101 can be an 8051-microcontroller unit that is known in the art. The microcontroller 101 also has control over a voltage associated with current flow at a given point in time. Typically, the given point in time includes a setting where a power adapter such as the single adapter unit 109 is connected to a USB device (not shown) that may require a power supply. This particular USB device may have its requisite conditions with respect to battery power supply nature, quality, and the like. Other concerns in other embodiments include space and size of the single adapter unit 109 which may include user preferences and market preferences.

The embedded algorithm in the microcontroller 101 is configured to compute a select current value based on a power sink device and thereby allow the microcontroller to adjust the current value accordingly.

The microcontroller 101 has operative correspondence with the PPS accelerator 104 as the microcontroller 101 is configured to instruct the PPS accelerator 104 and thereby affect the current flowing in the VBUS line 107 at a given point in time. The PPS accelerator 104 can interact with a voltage variation unit 106-1 that is configured varying voltages in order to affect and change the current flowing in the VBUS line 107. Voltage variation unit is control block for providing power delivery request to the power supply controller based on request from microcontroller. Another aspect of voltage variation unit is to control the slew rate of the voltage output from power supply controller. The interface of voltage variation unit is same as the power supply controller. For example, an I2C protocol or direct feedback mechanism. The PPS accelerator 104 is further configured to obtain a requisite current/voltage from the power supply controller 102. The PPS accelerator 104 is also configured to compute average or new current/voltage values (based on formulas disclosed herein and as otherwise known in the art) and provide the same to the microcontroller 101 for subsequent decision-making and other related assessment processes.

The PPS accelerator 104 allows and aids in the expedient decision-making process of the microcontroller 101. Accordingly, this allows for a lesser memory requirement in terms of software code associated with algorithm herein disclosed while at the same time, allowing for an optimal implementation in terms of associated hardware.

The power supply controller 102 is another component which has correspondence with the microcontroller 101 with respect to the detection of a current value on the VBUS line 107. The power supply controller 102 typically senses or detects a current value on the VBUS line 107 by an appropriate sensor or a detecting mechanism and conveys any respective information to the microcontroller 101. Typically, this is conducted with an ADC 107-1 device as known in the art. In other embodiments, other mechanisms are also possible and are thus envisioned in this disclosure.

Figure 2:
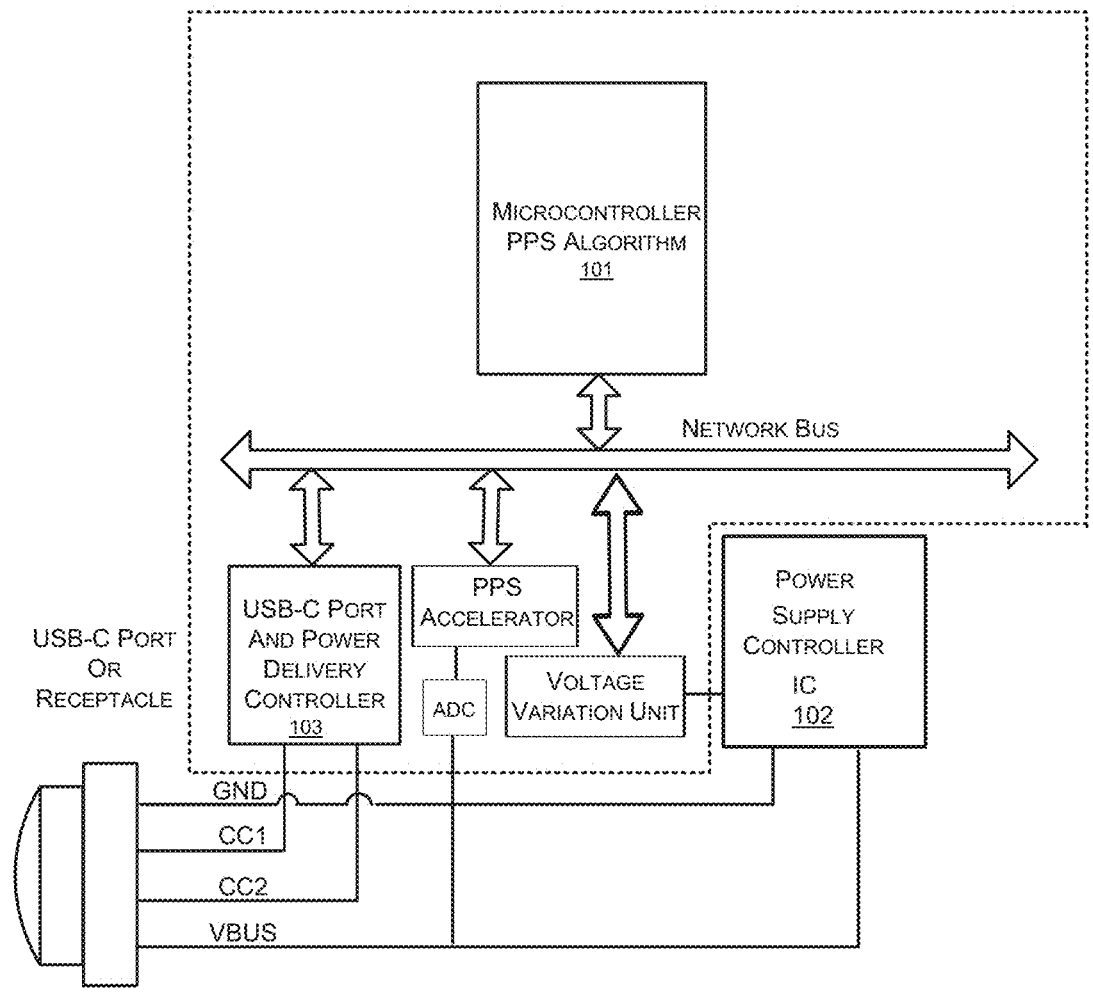
FIG. 2 illustrates a schematic representation of another embodiment apparatus for providing a programmable power supply in a USB-C system shown as having an independent unit, in accordance with an embodiment of the present disclosure.

The power supply controller 102 can be implemented within an integrated circuit as shown in FIG. 1 or as a separate integrated circuit on a system with the USB-C port as shown in FIG. 2 which is a yet another embodiment of the present invention. The interface to the power supply controller 102 can be based on any network protocol in accordance with the desired implementation. For example, the interface can be an I2C protocol as known in the art, or a direct current/voltage feedback mechanism as to the integrated circuit.

The apparatus 100 further is associated with a USB-C Port 105 as shown in FIG. 1. This USB-C port 105 along with the power delivery controller 103 serves to identify a connection/disconnection detection status on a USB-C port 105. The power delivery portion of the design is responsible for handling the power delivery messages in the format mandated by the specification. The power delivery controller 103 corresponds with the USB-C port 103 by configuration channel lines 106 as shown in FIG. 1 and these can include the power delivery messages.

The USB-C port 105 connects to a power sink device (not shown) that is capable of receiving power supply and thereby is charged and this aspect is affected by the VBUS line 107 connection between the USB-C port 105 and the power supply controller 102.

During operation, the apparatus 100 serves to monitor and change current flow in the USB-C system in accordance with the requirements of the power sink device. The power sink device can include a battery or any other power storage device. The power sink device can be part of peripheral USB device that has power-communication with the USB-C port 105.

The power supply controller 102 in correspondence with the microcontroller 101 reads a voltage and current value with respect to the VBUS line 107 during operation and sends the values to the microcontroller 101. The following formulaic representation is used by the microcontroller 101 for computing a new voltage/current that would be updated.

The original formula for computing the new voltage and new current are as follows. These formulae are the functional representation of function mentioned in FIG. 3 in 334 for obtaining new voltage and new current.

$$V_{NEW\_SET} = \frac{V_{SET} + ((-m1) * I_{SET})}{1 + \left(\frac{(-m1)}{m2}\right)}$$

-continued $$I_{NEW\_SET} = \frac{(V_{NEW\_SET} - V_{SET})}{m1} + I_{SET}$$

Where m1 and m2 are computed as per below equations:

$$m1 = \frac{V_{MIN} - V_{REQ}}{I_{CL\_OP}}$$

Where m1 is the slope in CL region and $I_{CL\_OP}$ is the maximum current variation in the CL region.

$$m2 = \frac{V_{SET}}{I_{AVG}}$$

Where m2 is also termed as $R_{NEW}$ and $I_{AVG}$ and $V_{SET}$ are received from the power supply controller 102 and PPS accelerator 104.

Figure 3:
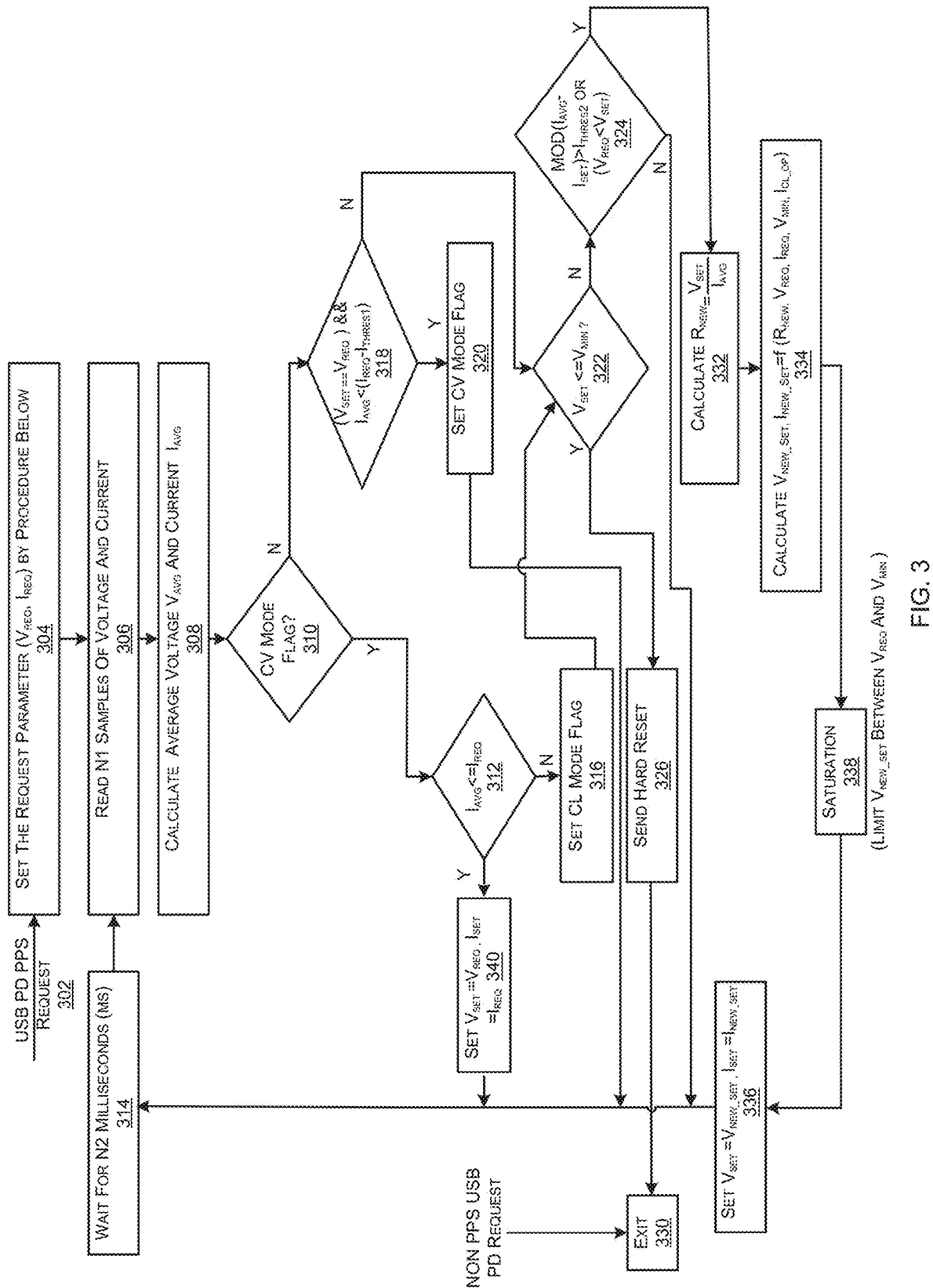
FIG. 3 illustrates a flowchart representation which is used as an embedded algorithm in the apparatus of the present embodiment to compute appropriate voltage values and current values, in accordance with an embodiment of the present disclosure.
Figure 4:
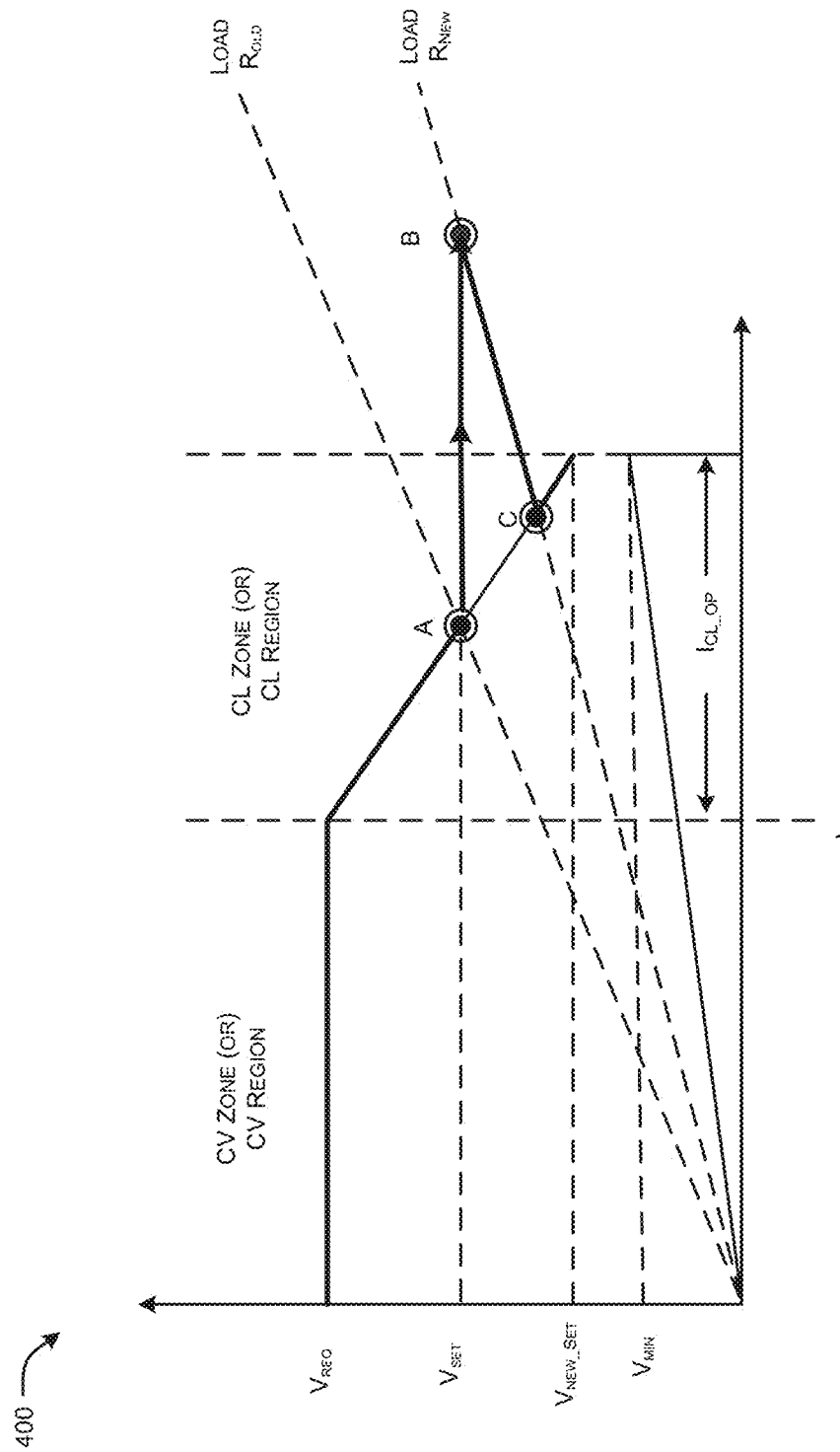
FIG. 4 illustrates a mode transition diagram between Constant Voltage (CV) and Constant Load/Constant Current (CL or CC) mode, in accordance with an embodiment of the present disclosure.

FIG. 3 illustrates the flowchart implementing the above-mentioned formulas while FIG. 4 illustrates the mode transition diagram between Constant Voltage (CV) and Constant Load/Constant Current (CL or CC) mode.

In an embodiment, at block 302 a USB PD PPS request may be received from an USB PD PPS capable power sink device. At block 304, request parameters ($V_{REQ}$, $I_{REQ}$), may be determined to calculate the CL line. At block 306, N1 samples of voltage and current may be read. At block 308, average voltage and current may be calculated. At block 310 it is determined if CV mode flag is set. If yes, at block 312, the flow proceeds to determine if $I_{AVG}<=I_{REQ}$. If yes, the control moves to block 340 where the $V_{SET}$ is set to $V_{REQ}$ and $I_{SET}$ is set to $I_{REQ}$ and then to block 314 for sampling and computation again. Else at block 316, set CL mode flag and the flow may move to block 322 to determine if $V_{SET}<=V_{MIN}$. $V_{MIN}$ is the shutdown voltage and can be set to 10%-15% of the minimum advertised voltage on USB PD PPS power profile during PPS flow.

If the CV mode flag is not set, at block 318, determine if $V_{SET}==V_{REQ}\&\&I_{AVG}<=(I_{REQ}-I_{THRES1})$ If yes, at block 320 set CV mode flag. If no, move to block 322. At block 322 it is determined that whether $V_{SET}<=V_{MIN}$ and on a positive result a USB PD hard reset is sent at block 326 and exit from PPS mode of USB PD at block 330. Any non-PPS USB PD request can also lead to exit at block 330 from the USB PPS mode. If $V_{SET}$ is not equal or less than $V_{MIN}$, then the flow moves to block 324, and determine if absolute value or modulus $(I_{AVG}-I_{SET})>I_{THRES2}$ OR $(V_{REQ}<V_{SET})$ If the result is negative, the flow moves to block 314, else at block 332 calculate $R_{NEW}=V_{SET}/I_{AVG}$. Then at block 334, calculate $V_{NEW\_SET}$, $I_{NEW\_SET}$ which are functions of $R_{NEW}$, $V_{REQ}$, $I_{REQ}$, $V_{MIN}$, $I_{CL\_OP}$(f($R_{NEW}$, $V_{REQ}$, $I_{REQ}$, $V_{MIN}$, $I_{CL\_OP}$)). The functional relationship is described above regarding how the $V_{NEW\_SET}$ and $I_{NEW\_SET}$ are computed using these parameters. Then at block 338, a saturation may be reached (i.e. limit $V_{NEW\_SET}$ between $V_{REQ}$ and $V_{MIN}$). Finally, the flow sets the $V_{SET}$ and $I_{SET}$ to $V_{NEW\_SET}$ and $I_{NEW\_SET}$ at block 340 before moving to block 314.

Although the proposed apparatus 100 has been elaborated as above to include all the main units, it is conceivable that actual implementations are well within the scope of the present disclosure, which can include without any limitation, only a part of the proposed units or a combination of those or a division of those into sub-units in various combinations across multiple devices that can be operatively coupled with each other, including in the cloud, to facilitate the desired implementation. Further, the units can be configured in any sequence to achieve objectives elaborated. Also, the proposed apparatus 100 can be configured in a computing device or across a plurality of computing devices operatively connected with each other, wherein the computing devices can be any of a computer, a laptop, a smart phone, an Internet enabled mobile device and the like. Therefore, all possible modifications, implementations and embodiments of where and how the proposed apparatus 100 is configured are well within the scope of the present invention.

The above-mentioned method is envisioned to be performed using appropriate physical devices that may be appreciated by a person skilled in the art. As such, all physical devices comprising respective various physical materials serve their respective functions and all such materials and their respective manufacturing methods are intended to be covered by this disclosure.

Thus, it will be appreciated by those of ordinary skill in the art that the diagrams, schematics, illustrations, and the like represent conceptual views or processes illustrating systems and methods embodying this invention. The functions of the various elements shown in the figures can be provided through the use of dedicated hardware as well as hardware capable of executing associated software. Similarly, any switches shown in the figures are conceptual only. Their function can be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention can be practiced without these specific details. In some instances, well-known structures and devices are shown in block diagram form, rather than in detail, to avoid obscuring the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention can be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The present disclosure provides a method and apparatus for implementing a programmable power supply on a USB-C port supporting power delivery.

The present disclosure provides a simple and cost-effective method and apparatus for implementing a programmable power supply on a USB-C port supporting power delivery.

The present disclosure provides a reliable and efficient method and apparatus for implementing a programmable power supply on a USB-C port supporting power delivery.

The present disclosure provides a robust method and apparatus for implementing a programmable power supply on a USB-C port supporting power delivery.

We claim:

1. An apparatus for providing a programmable power supply (PPS) in a Universal Serial Bus Type-C (USB-C) system, the apparatus comprising:
  a power supply controller configured to supply power on a VBUS line associated with the USB-C system;
  a PPS accelerator configured to compute an average or a new current/voltage value, wherein the computed average or the new current/voltage value is passed to a microcontroller;
  a voltage variation unit configured to maintain a respective constant current or a respective limited current on the VBUS line with respect to a constant current mode or a limiting current mode by varying a voltage value, wherein a constant power mode comprises the constant current mode;
  an analog/digital converter (ADC) configured to measure VBUS voltage and current; and
  a microcontroller, having an embedded power supply algorithm configured to compute a select current value, where the microcontroller is configured to constantly monitor, detect, compare, and adjust a given current value with respect to a select current value on the VBUS line,
  wherein the microcontroller is configured to adjust the given current value with respect to the select current value by use of the voltage variation unit subsequent to the computation of the select current value, and
  wherein a USB-C port and power delivery controller facilitates USB-C port and power delivery communication for the USB-C system.

2. The apparatus for providing a programmable power supply according to claim 1, wherein the power supply controller, the voltage variation unit, the ADC, the USB-C port, the power delivery controller, and the microcontroller form a single adapter unit.

3. The apparatus for providing a programmable power supply according to claim 2, wherein the single adapter unit further comprises a power delivery controller configured to identify a connection or a disconnection status on the USB-C port associated with the USB-C system along with power delivery communication.

4. The apparatus for providing a programmable power supply according to claim 3, wherein the controller is an 8051-type microcontroller.

5. The apparatus for providing a programmable power supply according to claim 3, wherein the single adapter unit includes the power supply controller, wherein the power supply controller detects the given current value on the VBUS line by receiving a Power Delivery request to the power supply controller.

6. The apparatus for providing a programmable power supply according to claim 5, wherein the power supply controller exists independently of the single adapter unit.

7. The apparatus for providing a programmable power supply according to claim 6, wherein the power supply controller detects the given current value on the VBUS line by means of an ADC.

8. The apparatus for providing a programmable power supply according to claim 7, wherein the power supply controller includes an interface subscribing to an I2C serial protocol for two-wire interface, or a direct current/voltage feedback mechanism through the voltage variation unit.

9. A method to provide programmable power supply (PPS) in a USB-C system, the method comprising:
determining, at a microcontroller, a plurality of samples corresponding to voltage and current and calculating an average voltage and current on receiving a Universal Serial Bus Power Domain (USB PD) PPS request;
determining, at the microcontroller, if a constant voltage mode flag is set;
upon receiving a positive confirmation that the constant voltage mode flag is set, for the microcontroller determining that a value for an average current is greater than a value for a constant load requested for the current, setting a constant load mode flag is set, for the microcontroller determining that the value for the average current is not greater than the volume for the constant load requested for the current, continuing to wait for a first configurable time and gathering a first configurable number of voltage and current samples; and
upon receiving a negative confirmation, for the microcontroller determining that a value for a voltage set is equal to a value for a voltage requested:
for a difference of requested current and a first configurable threshold current being greater than average current, setting a constant voltage mode flag, continuing to wait for a first configurable time, and gathering a first configurable number of voltage and current samples;
for the microcontroller determining the value for the voltage set is unequal to the value for the voltage requested or determining that the difference of the requested current and the first configurable threshold current are lesser than the average current:
for the microcontroller determining that the value for the voltage set is less than or equal to a minimum voltage value, generating a USB PD hard reset instruction,
for the value for the voltage set being larger than the minimum voltage value, for an absolute value or modulus of difference between average current and set current being greater than a second configurable threshold current or for requested voltage being less than set voltage, setting a new resistor parameter along with a new set voltage and a new set current, and setting a saturation limit, the saturation limit being when the new set voltage is between a voltage requested and a minimum voltage to establish a new value for the voltage subsequently setting the set voltage to new set voltage and set current to new set current, and waiting for a first configurable time period to determine, at the microcontroller, the plurality of samples corresponding to voltage and current and calculating an average voltage and current, and
for the absolute value or the modulus of the difference between the average current and the set current is less than or equal to the second configurable threshold current and the requested voltage is greater than the set voltage, continue waiting for a first configurable time-period and the plurality of samples corresponding to voltage and current for calculating an average voltage and current for next round of comparisons.

10. The method to provide a programmable power supply in a USB-C system according to claim 9, wherein the step of monitoring a current value by means of a controller includes a step of detecting, by means of a power supply controller included in the controller, the current value on the VBUS line associated with the USB-C system.

11. A non-transitory machine-readable medium having stored thereon instructions, which if performed by a machine cause the machine to perform a method comprising:
determining, at a microcontroller, a plurality of samples corresponding to voltage and current and calculating an average voltage and current on receiving a Universal Serial Bus Power Domain (USB PD) programmable power supply (PPS) request;
determining, at the microcontroller, if a constant voltage mode flag is set;
upon receiving a positive confirmation that the constant voltage mode flag is set, for the microcontroller determining that a value for an average current is greater than a value for a constant load requested for the current, setting a constant load mode flag is set, for the microcontroller determining that the value for the average current is not greater than the volume for the constant load requested for the current, continuing to wait for a first configurable time and gathering a first configurable number of voltage and current samples; and
upon receiving a negative confirmation, for the microcontroller determining that a value for a voltage set is equal to a value for a voltage requested:
for a difference of requested current and a first configurable threshold current being greater than average current, setting a constant voltage mode flag, continuing to wait for a first configurable time, and gathering a first configurable number of voltage and current samples;

for the microcontroller determining the value for the voltage set is unequal to the value for the voltage requested or determining that the difference of the requested current and the first configurable threshold current are lesser than the average current:

for the microcontroller determining that the value for the voltage set is less than or equal to a minimum voltage value, generating a USB PD hard reset instruction, for the value for the voltage set being larger than the minimum voltage value, for an absolute value or modulus of difference between average current and set current being greater than a second configurable threshold current or for requested voltage being less than set voltage, setting a new resistor parameter along with a new set voltage and a new set current, and setting a saturation limit, the saturation limit being when the new set voltage is between a voltage requested and a minimum voltage to establish a new value for the voltage subsequently setting the set voltage to new set voltage and set current to new set current, and waiting for a first configurable time period to determine, at the microcontroller, the plurality of samples corresponding to voltage and current and calculating an average voltage and current, and for the absolute value or the modulus of the difference between the average current and the set current is less than or equal to the second configurable threshold current and the requested voltage is greater than the set voltage, continue waiting for a first configurable time-period and the plurality of samples corresponding to voltage and current for calculating an average voltage and current for next round of comparisons.

* * * * *